United States Patent
Pontes Bittencourt (10) Patent No.: US 12,544,746 B2
(45) Date of Patent: *Feb. 10, 2026

(54) METHOD FOR PREPARING A STEAM REFORMING CATALYST, CATALYST AND RELATED USE

(71) Applicant: Petróleo Brasileiro S.A.—Petrobras, Rio de Janeiro (BR)

(72) Inventor: Roberto Carlos Pontes Bittencourt, Rio de Janeiro (BR)

(73) Assignee: Petróleo Brasileiro S.A.—Petrobras, Rio de Janeiro (BR)

( * ) Notice: Subject to any disclaimer, the term of this patent is extended or adjusted under 35 U.S.C. 154(b) by 524 days.

This patent is subject to a terminal disclaimer.

(21) Appl. No.: 17/791,643

(22) PCT Filed: Jan. 5, 2021

(86) PCT No.: PCT/BR2021/050005
§ 371 (c)(1),
(2) Date: Jul. 8, 2022

(87) PCT Pub. No.: WO2021/138728
PCT Pub. Date: Jul. 15, 2021

(65) Prior Publication Data
US 2023/0182125 A1    Jun. 15, 2023

(30) Foreign Application Priority Data
Jan. 8, 2020    (BR) .................. 10 2020 000434 4

(51) Int. Cl.
*B01J 23/755* (2006.01)
*B01J 27/25* (2006.01)
(Continued)

(52) U.S. Cl.
CPC ......... *B01J 37/0205* (2013.01); *B01J 23/755* (2013.01); *B01J 27/25* (2013.01);
(Continued)

(58) Field of Classification Search
CPC ...... B01J 23/755; B01J 23/781; B01J 35/397; B01J 35/40; B01J 37/0236; B01J 37/08;
(Continued)

(56) References Cited

U.S. PATENT DOCUMENTS 2,961,414 A * 11/1960 Lefrancois ............... B01J 23/40
502/262
3,391,089 A * 7/1968 Mayland ................. B01J 23/755
502/328
(Continued)

FOREIGN PATENT DOCUMENTS

| CN | 102247856 A | 11/2011 |
| CN | 105903468 A | 8/2016 |

(Continued)

OTHER PUBLICATIONS

Lima et al. (Hydrogen production by glycerol steam reforming over Ni based catalysts prepared by different methods, Biomass and Bioenergy 130 (2019) 105358).*
(Continued)

*Primary Examiner* — Jun Li
(74) *Attorney, Agent, or Firm* — Morrison & Foerster LLP (57) ABSTRACT

The present invention addresses to a method of preparing steam reforming catalysts, of the eggshell type, using a solution of glycerin, in polar solvent, preferably water, to occupy the pores of a support. Next, the solvent is removed and the support is impregnated with a nickel salt solution,
(Continued)

which may contain promoters such as rare earths. The steps can be repeated until the desired content of the active phase and promoters is reached.

18 Claims, 5 Drawing Sheets

(51) Int. Cl.
*B01J 35/08* (2006.01)
*B01J 35/10* (2006.01)
*B01J 35/61* (2024.01)
*B01J 37/02* (2006.01)
*B01J 37/08* (2006.01)
*C10G 47/12* (2006.01)
*B01J 35/40* (2024.01)
*B01J 35/51* (2024.01)
*B01J 35/55* (2024.01)

(52) U.S. Cl.
CPC ......... *B01J 35/613* (2024.01); *B01J 37/0236* (2013.01); *B01J 37/08* (2013.01); *C10G 47/12* (2013.01); *B01J 35/40* (2024.01); *B01J 35/51* (2024.01); *B01J 35/55* (2024.01); *B01J 2235/00* (2024.01); *C10G 2300/703* (2013.01); *C10G 2300/807* (2013.01)

(58) Field of Classification Search
CPC .... C01B 2203/1058; C01B 2203/1082; C01B 2203/1094
See application file for complete search history.

(56) References Cited

U.S. PATENT DOCUMENTS

| | | | |
|---|---|---|---|
| 4,519,951 | A | 5/1985 | Qualeatti et al. |
| 8,716,170 | B2 | 5/2014 | Wolan et al. |
| 9,393,552 | B2 | 7/2016 | SkjøTh-Rasmussen et al. |
| 9,463,441 | B2 | 10/2016 | Forrest et al. |
| 9,480,971 | B2 | 11/2016 | Carlsson et al. |
| 10,071,366 | B2 | 9/2018 | Forrest et al. |
| 10,076,744 | B1 | 9/2018 | Carlsson et al. |
| 12,017,915 | B2 * | 6/2024 | Pontes Bittencourt .. B01J 23/83 |
| 2013/0281289 | A1 * | 10/2013 | Forrest ................... B01J 35/395 502/328 |
| 2016/0375426 | A1 | 12/2016 | Forrest et al. |

FOREIGN PATENT DOCUMENTS

| | | | | |
|---|---|---|---|---|
| CN | 105944730 A | * | 9/2016 | ............ B01J 23/755 |
| EP | 0355231 A1 | * | 2/1990 | .............. B01J 21/12 |
| WO | 2008122636 A2 | | 10/2008 | |
| WO | 2020234561 A1 | | 11/2020 | |

OTHER PUBLICATIONS

Cotton et al. (Sep. 2004). "Common Problems on Primary Reformers," Ammonia Plant Safety & Related Facilities: a Technical Manual; pp. 350-362.

Rostrup-Nielsen, J. (1984). "Catalytic Steam Reforming," J.R. Anderson and M. Boudart eds., Springer-Verlag; pp. 1-106.

* cited by examiner

METHOD FOR PREPARING A STEAM REFORMING CATALYST, CATALYST AND RELATED USE

CROSS-REFERENCE TO RELATED APPLICATIONS

This application is a national stage application, filed under 35 U.S.C. § 371, of PCT International Patent Application No. PCT/BR2021/050005, filed on Jan. 5, 2021, and claims benefit of and priority to Brazilian Application No. 10 2020 000434 4, filed on Jan. 8, 2020, the disclosures of all of which are incorporated herein by reference in their entireties.

FIELD OF THE INVENTION

The present invention addresses to a method of preparing steam reforming catalysts, with lower production cost and greater efficiency, applied in the field of hydrogen or hydrogen-rich gases production, for use in the hydrotreatment of oil streams, for the production of synthetic fuels (Fischer-Tropsch process), methanol, ammonia and in various industrial hydrogenation processes. More specifically, it addresses to the preparation of catalysts with a predominance of the active phase close to the outer surface of the particles, known as eggshell-type catalysts.

DESCRIPTION OF THE STATE OF THE ART

Hydrogen is produced on a large scale in the refining industry for use in hydrotreating processes of oil streams, such as gasoline or diesel, adapting its quality to the standards of current environmental legislation. Hydrogen or $H_2$-rich gases are also widely used in the chemical industry, in the production of synthetic fuels (Fischer-Tropsch process), methanol, ammonia and in various hydrogenation processes, such as those used in the food industry. Hydrogen is produced industrially, mainly by the steam reforming process.

There are different configurations for the steam reforming process depending on the technology used, the purity or the desired use of the produced $H_2$. A common feature to all these variations of the process is the presence of the reactor called the primary reformer. The main reactions that occur in the primary reformer are represented below (reactions 1, 2 and 3):

$C_nH_m + nH_2O = nCO + (n+1/2n) H_2$ (endothermic reaction)      Reaction 1

$CH_4 + H_2O = CO + 3H_2$ (endothermic, 206.4 kJ/mol)      Reaction 2

$CO + H_2O = CO_2 + H_2$ (exothermic, −41.2 kJ/mol)      Reaction 3

The primary reformer is a reactor consisting of metallic tubes, containing catalysts, installed inside a furnace, so that the heat necessary for the set of reactions 1 and 2 is supplied by burning fuel. Metal tubes present a typical outer diameter of 7 cm to 15 cm and height between 6 m and 13 m. The effluent combustion gas from the reforming furnace is used to generate the steam necessary for the process (reactions 1, 2 and 3). The typical charge inlet temperature (mixture of hydrocarbons and water vapor) in the primary reformer is from 400° C. to 550° C. and the outlet temperature of products varies from 750° C. to 950° C., at typical pressures of 10 to 40 kgf/cm² (0.98 to 3.92 MPa).

The reformer tubes are manufactured with special high-cost metal alloys and are designed to operate for 100,000 hours. The useful life of the tubes, however, is severely reduced if their wall temperature exceeds the design value (Rostrup-Nielsen, J. R., "*Catalytic Steam Reforming*", Catalysis Science and Technology, Spring-Verlag, New York, 1984, pp. 1-117). One of the well-known causes for the appearance of high temperature regions in the tube wall is the low activity of the catalyst. In addition to reducing the useful life of the tubes, a high temperature on the wall of the same can lead to a reduction in the capacity of the unit and/or its shutdown for the replacement of the catalyst, aiming at minimizing the risks of rupture of the tubes in operation (Cotton, B., Broadhurst, P., 2004, "*Common problems on primary reformers*", 49th Annual Safety in Ammonia Plants and Related Facilities Symposium, AIChE Safety, Denver, CO, USA). It is evident that it is highly desirable to develop steam reforming catalysts with high activity and that have properties that allow the maintenance of this activity for long periods.

The catalysts industrially used in the primary reforming step of the steam reforming process typically consist of nickel oxide species deposited on a refractory support. The commercially-used supports are alpha-alumina and refractory cements of the calcium aluminate and/or magnesium aluminate-type or a mixture of the same, which may contain promoting compounds, such as oxides of transition metals and alkali metals, particularly potassium, in shapes such as cylinders with a single hole or with multiple holes, such as 4, 6 or 12 holes. The particles of the catalyst support have dimensions such as 13 mm to 19 mm in diameter and 10 mm to 20 mm in length. The dimensions and shape of the support particles seek to conciliate a low pressure drop in the process with high mechanical strength of the particles and a high activity of the catalyst.

Steam reforming catalysts are prepared, in general, by methods of impregnation of an aqueous solution of nickel salt on a support, followed by drying and calcination, seeking to achieve a uniform distribution of the active phase within the particles of the support. It happens that, due to the dimensions of the catalyst particles and the high process temperature used in the primary reformer, the effects of mass transfer become important, causing, in practice, reactions 1, 2 and 3 to occur only in the outer surface layer of the catalyst particle, while the active metal inside these particles is not fully utilized.

A steam reforming catalyst with a predominance of the active phase close to the outer surface of the particle is called an "eggshell". When compared to steam reforming catalysts with homogeneous distribution along the particle, eggshell-type catalysts have the potential advantages of lower active phase content, such as nickel, thus reducing production costs and preserving the planet's resources and, in addition, favoring the industrial use of more expensive active phases, such as noble metals, as they are used in smaller amounts in the catalyst formulation. Such more complex formulations, as they contain elements other than nickel, can provide greater activity or lower deactivation of steam reforming catalysts, with acceptable costs for their industrial use on a large scale.

The literature teaches methods of preparing steam reforming eggshell catalysts. Patents US 2016/0375426, U.S. Pat. Nos. 94,643,441 and 10,071,366 describe a method of preparing a catalyst comprising impregnating a metal aluminate-type support with a nickel acetate solution at temperatures greater than or equal to 40° C., followed by drying and calcination. The catalyst thus prepared was tested in the steam reforming reaction and presented a better performance than the catalyst of the comparative example of the state of the art prepared from impregnation with nickel nitrate solution, where an eggshell distribution of the phase of NiO was not obtained. It can be considered that the use of nickel acetate-type salt, instead of nickel nitrate, has disadvantages such as its lower solubility in the aqueous phase, which may lead to the need for several repetitions of the impregnation, drying and calcination steps to obtain the desired content of NiO. The use of acetate-type salt, even if it were extended to elements other than nickel, which is not taught in the state of the art, would lead to a difficulty in the preparation of catalysts containing other elements, such as rare earths or noble metals, due to the fact that there is no commercially available metal salt in the form of acetate or because of its high cost, when compared to salts of the nitrate type. Nickel nitrate presents a technical difficulty for the preparation of eggshell-type catalysts, which is its low melting point of only 56.7° C., causing it to tend to move and distribute homogeneously along the support particle, during drying or calcination steps.

U.S. Pat. Nos. 9,480,971 and 10,076,744 teach a method of preparing a catalyst using calcium aluminate-type support where, before the step of impregnation with the solution containing one or more metallic elements, the calcium aluminate-type support is impregnated with water in a rehydration step. Next, there is the impregnation of the support with the solution containing one or more metallic elements, drying and calcination. Optionally, the steps are repeated until the desired content of metallic components is reached. A particularity of these inventions is that, in all examples, the contact time between the rehydrated support and the aqueous solution containing the metals is 5 minutes. We can expect that long contact times between the support and the solution favor the penetration of the metallic phase, with loss of eggshell distribution. On the other hand, longer contact times are desirable to properly carry out the industrial operations of impregnation and liquid phase separation. Another particularity is that the rehydrated calcium aluminate-type materials are dried before impregnation with the solution of metallic salts, which indicates that there are specific chemical transformations that make the method not of general use to a wide variety of other materials used as support for steam reforming catalysts.

U.S. Pat. No. 9,393,552 teaches an eggshell-type catalyst consisting of a nickel metal alloy and iridium or ruthenium as an active phase on a support such as alumina, zirconia, magnesia, titania or a mixture thereof. The catalyst has application in the autothermal reforming reaction, that is, in the presence of oxygen or air. The catalyst is preferably prepared by first introducing the nickel homogeneously into the support through impregnation, drying and calcination steps. Subsequently, impregnation is carried out on the nickel catalyst with an aqueous solution of the iridium salt ($IrCl_3 \cdot H_2O$ or iridium acetate) or Ru ($Ru(NO_3)_3NO$ or $RuCl_3 \cdot nH_2O$), followed by steps of drying, calcination and reduction, in order to obtain an eggshell-type noble metal distribution. The invention teaches that the occurrence of the eggshell distribution occurs due to the interaction of specific anions, such as $IrCl_6^{3-}$ in aqueous solution with positive charges on the surface of the alumina such as $Al^-(OHW_2)^+$ or other basic species on the support.

U.S. Pat. No. 8,716,170 teaches a method of preparing eggshell catalysts, comprising the steps of first adsorbing and then removing part of a non-polar solvent on the support, adsorbing a polar solvent on the particle, in order to have a biphasic particle, with the non-polar solvent inside and the polar solvent in the outermost region of the support particle. Next, the particle is contacted with a solution of a metallic salt in a polar solvent, and the pH is adjusted by the addition of a non-aqueous base to nucleate the particles of the metallic precursor. The drying and calcination steps are then followed. As non-polar solvents, it includes C7 to C10 hydrocarbons and, as polar solvents, ethanol or other alcohols. In the example, n-heptane is used as a non-polar solvent, ethanol as a polar solvent and urea as a base to prepare a Co/silica catalyst for use in "Fischer-Tropsch" processes. It can be noted that this taught method is not widely applicable, as it depends on the interaction properties of the support with salt precipitated by the addition of non-aqueous base solution for pH adjustment.

Patent CN 105903468 discloses a method of preparation and application of a noble metal and molybdenum, eggshell-type, catalyst used for hydrogenation and removal of impurities from polyvinyl ether-based lubricating oil. The preparation method comprises the following steps: adding a support to a solution of noble metal salt and molybdenum salt, controlling the deposition of noble metal nanoparticles and metallic molybdenum nanoparticles on the surface of the support through a rapid reduction reaction and the control of the solution viscosity, filtering the obtained material, washing the filtered material and drying the washed material in an inert atmosphere to form the eggshell-type PdMo catalyst. As a reducing agent, the method teaches the use of $NaBH_4$ (sodium borohydride) in a liquid phase reaction, with the concentration of $NaBH_4$ being used to control the reaction rate and favor the deposition of noble metal and molybdenum in an eggshell-type distribution. $NaBH_4$ is a well-known reducing agent used in organic chemistry, also known for generating corrosive by-products and release hydrogen and diborane, which are flammable elements. The produced material must be protected from the air to prevent oxidation. This method has several restrictions that make its wide use difficult.

Patent CN 102247856 discloses a nickel-based bifunctional hydrogenation catalyst with metal distribution being of the eggshell type and a method of preparation and application thereof, and pertains to the technical field of hydrogenation catalysts. The catalyst support can be selected from the group consisting of alumina, silica, activated carbon, titanium dioxide or molecular sieve. The catalyst preparation method involves the use of ionizing radiation to obtain the metallic phase from metallic precursors, such as oxides obtained by calcination.

Thus, there is still a need to provide a method of preparing eggshell catalysts that allows a control of the thickness of the active layer, using any metallic salt and allowing the incorporation of promoters, either in aqueous or organic solution, which does not depend on certain interaction with the support or on pH adjustment for deposition of the active phase layer and which is, therefore, of wide and general use and whose catalyst thus obtained can be applied to the steam reforming process for the production of hydrogen or syngas. Additionally, there is still a need for a method of preparing eggshell catalysts that does not make use of chemical agents with high toxicity or dangerousness or use of ionizing radiation or other methods with potential harm to humans and the environment.

In the present invention, a method of preparing steam reforming catalysts of the eggshell type is described, which uses a solution of glycerin, in water or in another solvent, to, in a first step, occupy the pores of the support. Next, the solvent is removed and the active phase is impregnated using a solution, preferably an aqueous solution of a nickel salt, which may contain other promoters, such as lanthanum, cerium, copper or noble metals. The steps can be repeated until the desired content of the active phase and promoters is reached. The concentration of the glycerin solution allows to control the depth of penetration of the precursors, that is, it allows to control the depth of the eggshell layer.

The method presents several advantages over the state of the art:
a) It allows the use of nickel nitrate in the impregnation phase, although the state of the art describes the failure of this salt in the production of catalysts with eggshell distribution;
b) It allows the use of any nickel salts and/or promoters;
c) It allows an easy control of the thickness of the NiO layer on the support by controlling the concentration of glycerin in the solvent;
d) It uses glycerin, which is a by-product of the industrial production of biodiesel, increasing the destination of this material, which is produced in increasing quantities in the world;
e) It can be used for different types of support, without the need for a support with a specific chemical composition.

BRIEF DESCRIPTION OF THE INVENTION

The present invention addresses to a method of preparing a catalyst, and to the catalyst thus obtained, for use in $H_2$ production processes or in other processes whose reactions are subject to mass transfer restrictions, where the active phase of nickel oxide and promoters is concentrated on the surface or in a small depth layer on the support particles. The method of preparing the catalyst involves impregnating the support with a solution of glycerin and solvent, in a proportion adjusted to define the penetration of the active phase layer into the support, drying the material thus impregnated to remove the solvent, impregnating the material with a solution of nickel salt and promoters, drying and calcining the material to obtain the active phase layer.

BRIEF DESCRIPTION OF DRAWINGS

The present invention will be described in more detail below, with reference to FIGS. 1 to 8 which, in a schematic way and not limiting the inventive scope, represent examples of its embodiment. In the drawings, there are.

DETAILED DESCRIPTION OF THE INVENTION

The present invention addresses to a method of preparing a catalyst applicable to the steam reforming reaction where the active phase containing nickel is located in the outer layer of the particle or with a thickness of less than 0.2 mm, preferably less than 0.1 mm.

The adopted solution was a method of preparing a catalyst comprising the following steps:
a) impregnating an inorganic oxide support with a solution of glycerin and water;
b) drying the inorganic oxide support to remove water;
c) impregnating the glycerin-containing support with a solution containing a nickel soluble salt, preferably nickel nitrate;
d) drying the nickel salt impregnated support;
e) calcining the nickel salt impregnated support to transform this salt into a nickel oxide layer located on the surface or at a small depth of the support;
f) optionally, repeating steps c) to e) to obtain the desired content of nickel oxide.

The inorganic oxide support is selected from the group consisting of alpha- or theta-alumina, calcium aluminate, magnesium aluminate, hexa-aluminates, rare earth oxide or mixtures thereof, and may contain alkali metals, preferably potassium, in contents of up to 10% m/m. The support can have different shapes such as cylinders or spheres containing one or multiple holes, and its outer surface can be smooth or preferably wavy, to increase the outer area. The diameter and length of the support particles are between 10 mm and 25 mm. Preferably, the support has a surface area (measured by the nitrogen adsorption technique) between 1 and 100 $m^2/g$, preferably between 10 $m^2/g$ and 80 $m^2/g$.

The impregnation of the support with the glycerin and water solution can be carried out by the pore volume methods or, preferably, by the excess solution method. In the preferred method, the support particles are immersed in the glycerin and water solution at temperatures below 90° C., preferably at room temperature, for a period of time sufficient for the solution to penetrate the interior of the particles. Typically, 10 minutes are sufficient for this purpose, but longer times can be used, when necessary. Water is the preferred solvent for glycerin solution because of its low cost and high miscibility with glycerin. Other polar solvents, like alcohols, such as methanol or ethanol, can also be used, when there is some degradation of the support in the presence of water or when it is advantageous to use a solvent with a boiling point lower than that of water to reduce the costs of the steps of drying.

The proportion of solvent, preferably water, in the glycerin solution is chosen in order to control the penetration of the nickel oxide phase into the support particle. As an example, a solution containing 10% water and 90% glycerin is used when it is desired that only 10% of the pore volume of the support is available for later occupation with the nickel solution. This available volume will be located close to the surface of the particles, while the interior of the particles will remain occupied by glycerin. In this way, after the subsequent steps of impregnation with the solution containing nickel salt, drying and calcination, a layer of nickel oxide will preferably be formed in the space previously occupied by water, covering the surface of the particle and with controlled thickness. The thickness of the nickel oxide layer is less than 0.2 mm, preferably less than 0.1 mm.

The drying of the inorganic oxide support containing the glycerin and water solution must be carried out in order to remove the water and preserve the glycerin phase inside the support particles; for this purpose, temperatures between 50° C. and 90° C. are preferable, as they allow a slow and gradual removal of water without dragging the glycerin phase. Drying temperatures above 100° C. can cause rapid water vaporization (and drag of the glycerin phase), in addition to favoring the breakage or reduction of the mechanical strength of the support particles. The maximum drying temperature must be below the boiling point of glycerin at 290° C.

The impregnation of the support containing glycerin with the nickel salt solution can be carried out by the impregnation technique of the pore volume or preferably by the technique of excess solution. Water is preferably used as a solvent because of its low cost and high solubility of nickel salts. Other polar solvents, like alcohols, such as methanol or ethanol, can also be used, if there is any degradation of the support in an aqueous medium. The preferred nickel salt is nitrate, such as $Ni(NO_3)_3 \cdot 6H_2O$, due to its low cost and high water solubility. The impregnation can be carried out at room temperature or preferably at temperatures up to 90° C. to increase the solubility of nickel nitrate and, consequently, reduce the number of repetitions of the steps necessary to obtain the desired content of nickel oxide in the support. The contact times between the nickel solution and the support containing glycerin are less than 1 hour, preferably less than 30 minutes and more preferably less than 5 minutes, considering aspects of increasing the productivity of the process. However, times longer than 1 hour can be used, when industrially necessary for reasons of logistics, type or handling of equipment, without losing the formation of the surface layer of nickel oxide. Several promoters can be added to the nickel salt solution in order to increase the activity or the resistance to coke deposition in the $H_2$ production process by steam reforming, being preferable the addition of rare earth elements, such as lanthanum and cerium, or other elements such as copper or noble metals.

The drying of the support can be carried out preferably at temperatures lower than 90° C., with no limitation as to drying the material at temperatures below the melting temperature of the salts, such as nickel nitrate. The calcination for the decomposition of the nickel precursor salts and the formation of the nickel oxide layer is carried out between 300° C. and 600° C., preferably between 350° C. and 450° C.

The method does not require pH control, or the addition of complexing agents or the use of specific nickel salts, such as acetates, to control the interaction between the charges of the metallic cations and the surface of the support, in order to obtain the nickel oxide layer on the surface of the support particles.

The catalyst thus prepared will be in the form of nickel oxide deposited on a refractory support and, for use in reactions where an active phase of metallic nickel is required, such as in hydrogenation or steam reforming reactions, it is necessary to carry out a reduction procedure, which can preferably be carried out "in-situ", that is, inside the industrial reactor. For the steam reforming process, the "in-situ" reduction is preferably carried out by passing hydrogen and steam or natural gas and steam, in the molar ratios of steam/$H_2$ or steam/C between 6 and 8 mol/mol at temperatures above 400° C., preferably above 550° C., at the inlet of the process gases in the tubes of the primary reformer, and between 700° C. and 900° C. at the outlet of the process gases from the tubes of the primary reformer. The pressure to be used during the reduction is limited by the metallurgy of the tubes or by equipment such as compressors, in general, pressures between 5 and 15 kgf/cm$^2$ (0.49 and 1.47 MPa) are typically used in the reduction step. The natural gas used in this way must be free of sulfur and olefins (<0.1% v/v). In another understanding, catalysts can be reduced externally to the unit using hydrogen or hydrogen-rich gases and then passivated with mixtures, preferably less than 5% v/v oxygen, air or carbon dioxide in nitrogen. When the passivation process is carried out at temperatures below 50° C., natural gas can be used as an inert gas.

The catalyst thus prepared has preferential application in reactions where there are restrictions on mass transfer within the support particles, such as occurs, due to the high temperatures of the process, in the steps of primary reform, secondary reform and to a lesser extent in the pre-reforming step of the steam reforming process for the production of hydrogen or hydrogen-rich gases and in liquid-phase hydrogenation reactions.

EXAMPLES

The following examples are presented in order to illustrate the nature of the present invention and the manner of practicing the same, without, however, being considered as limiting its content.

Example 1

Figure 1:
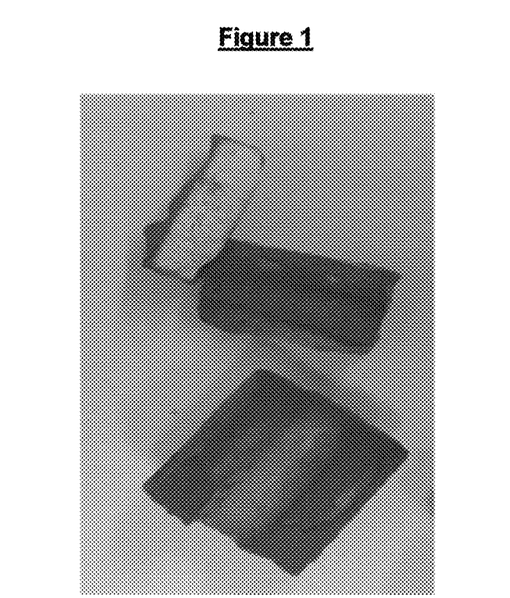
FIG. 1 illustrating a NiO/magnesium aluminate catalyst, prepared according to Example 1, using prior impregnation of the support with water and nickel acetate aqueous solution. The darker color indicates the presence of nickel oxide.

This example illustrates the preparation of a catalyst containing nickel oxide, using nickel acetate and a commercial support. Ten grams of a magnesium aluminate-type support (DYTECH, Ceraguard 1616, with dimensions of 16×16×7 mm, in the shape of a ring with 6 holes) were broken into smaller pieces. The support was then immersed in deionized water for 10 minutes, drained and weighed, obtaining a content of 0.27 g of water/g of support. Then, the material was partially dried at 70° C. for 30 minutes, the water content being reduced to 0.19 g of water/g of support, and then immersed and kept for 10 minutes in an aqueous solution containing 20 g of tetrahydrate nickel acetate ($C_4H_6NiO_4 \cdot 4H_2O$) in 200 g of water. Then the material was separated from the solution, dried at 100° C. for 1 hour and calcined at 400° C. for 1 hour, obtaining a distribution of the nickel oxide phase with eggshell predominance, as can be seen in FIG. 1.

Example 2

Figure 2:
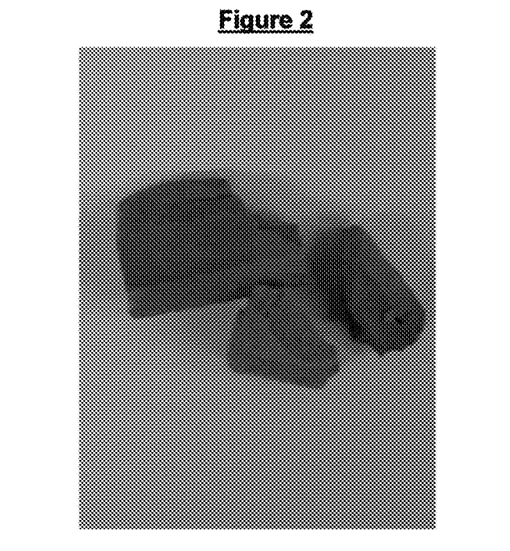
FIG. 2 illustrating a NiO/magnesium aluminate catalyst, prepared according to Example 2, using prior impregnation of the support with water and nickel nitrate aqueous solution. The darker color indicates the presence of nickel oxide.

This example illustrates that the use of nickel nitrate does not allow to obtain an eggshell distribution of the nickel oxide phase, when the catalyst is prepared according to the state of the art. The preparation was carried out in a similar way to EXAMPLE 1, except that, in the immersion step of the pellets in the aqueous solution of nickel salt, a solution of nickel nitrate $(Ni(NO_3)_2 \cdot 6H_2O)$ at 70% m/m was used. The final catalyst showed a distribution of nickel oxide inside the particle, as illustrated in FIG. 2. Alterations to the method were tested, but the eggshell distribution was not obtained in any of the variations: a) use of a contact time of 3 minutes; b) use of temperatures at 200° C. in the drying step and direct placement of the wet samples in the oven at 400° C. In this last condition, there were still technical problems related to the breakage and projection of the samples due to the sudden loss of moisture and generation of gases. The final product showed distribution of NiO along the entire particle, showing the difficulty of using nickel nitrate to prepare eggshell catalysts by the technique described in the state of the art.

Example 3

Figure 3:
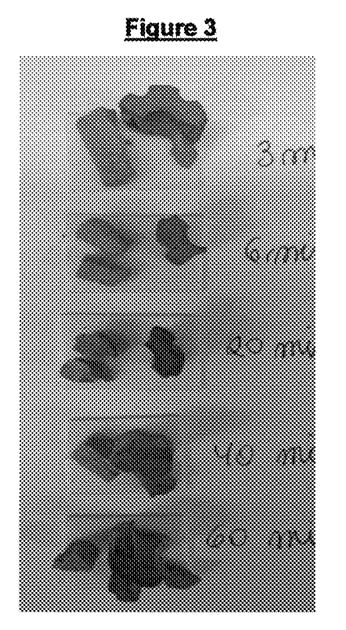
FIG. 3 illustrating a NiO/magnesium aluminate catalyst, prepared according to Example 3, using prior impregnation of the support with n-heptane and nickel nitrate aqueous solution. The darker color indicates the presence of nickel oxide.

This example, according to the state of the art, illustrates that the previous impregnation of the support with non-polar hydrocarbons and the subsequent immersion in an aqueous solution of nickel nitrate favors a homogeneous distribution of the nickel oxide phase, not obtaining the desired eggshell distribution. Ten grams of a magnesium aluminate-type support (DYTECH, Ceraguard 1616, with dimensions of 16×16×7 mm, in the shape of a ring with 6 holes) were broken into smaller pieces. The support was then immersed in n-heptane for 10 minutes, drained and weighed and partially dried at 70° C. for 3 minutes, obtaining a content of n-heptane inside the particles of 0.20 mL/g. Next, the material was immersed and maintained for 10 minutes in an aqueous solution of 80% m/m of nickel nitrate $(Ni(NO_3)_2 \cdot 6H_2O)$. Next, the material was separated from the solution, dried at 100° C. for 1 hour and calcined at 400° C. for 1 hour, obtaining a distribution of the nickel oxide phase inside the particles, as shown in FIG. 3, even for a contact time with the nickel nitrate solution as short as 3 minutes.

Example 4

Figure 4:
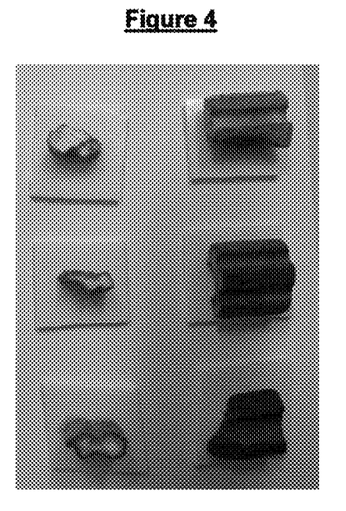
FIG. 4 illustrating a NiO/magnesium aluminate catalyst, prepared according to Example 3 (top), Example 4 (middle) and Example 5 (bottom), using prior impregnation of the support with glycerin aqueous solution and nickel nitrate aqueous solution. The darker color indicates the presence of nickel oxide.

This example, according to the present invention, illustrates the preparation of a catalyst containing nickel oxide located predominantly on the surface or in a layer close to the surface of a preformed support. One hundred grams of a magnesium aluminate-type support (DYTEC, Ceraguard 1616, with dimensions of 16×16×7 mm in the shape of a ring with 6 holes), without being previously dried, were immersed in a solution containing 80% glycerin and 20% water, at room temperature (25° C.) for 10 minutes, followed by gravity drainage and drying at 70° C. for 2 hours to remove the water. Next, the pellets were immersed for 20 minutes in an aqueous solution containing 70% m/m nickel nitrate $(Ni(NO_3)_2 \cdot 6H_2O)$ at room temperature. The material was next gravity drained, dried at 70° C. for 2 hours and calcined with a temperature scheduling from 70° C. to 400° C. at a rate of 10° C./min. The temperature of 400° C. was maintained for 2 hours. The pellets were broken for visual inspection, which showed the predominance of the nickel oxide phase on the surface of the particles, as illustrated in FIG. 4.

Example 5

This example was carried out as described in Example 4, with the difference that the procedure was repeated 2 times to increase the content of incorporated nickel oxide. The pellets were broken for visual inspection, which showed the predominance of the nickel oxide phase on the surface of the particles, as illustrated in FIG. 4.

Example 6

This example was carried out as described in Example 4, with the difference that the procedure was repeated 3 times to increase the content of nickel oxide incorporated. The pellets were broken for visual inspection, which showed the predominance of the nickel oxide phase on the surface of the particles, as seen in FIG. 4.

Example 7

Figure 5:
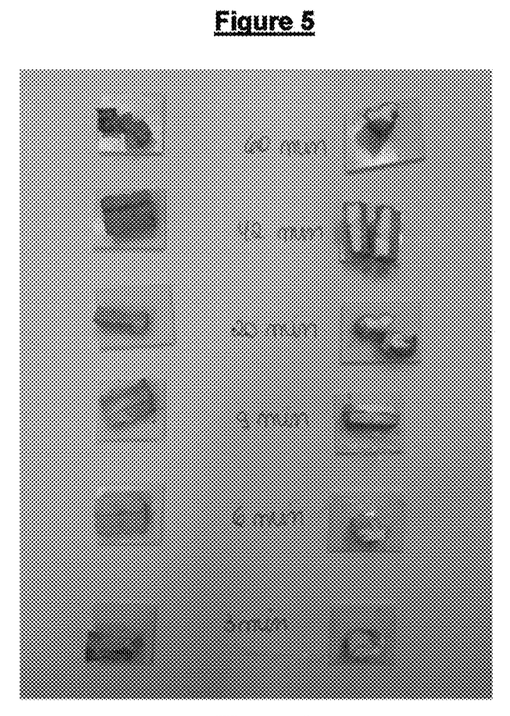
FIG. 5 illustrating a NiO/magnesium aluminate catalyst, prepared according to Example 5, using prior impregnation of the support with glycerin aqueous solution and nickel nitrate aqueous solution. The darker color indicates the presence of nickel oxide.

This example, according to the present invention, illustrates that contact times greater than 1 hour, between the support previously impregnated with the glycerin solution and the aqueous solution of nickel nitrate, do not affect the distribution of the oxide layer nickel, which remains predominantly on or near the surface. The pellets were broken for visual inspection, which confirmed the predominance of the nickel oxide phase on the surface of the particles, as shown in FIG. 5, for all tested contact times.

Example 8

Figure 6:
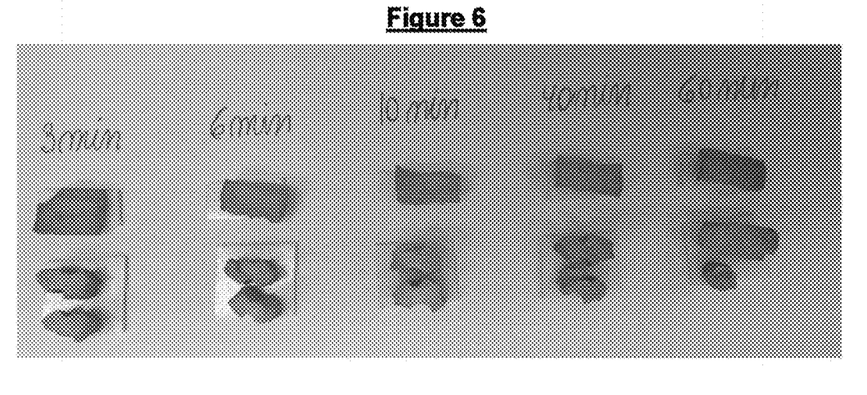
FIG. 6 illustrating a NiO/magnesium aluminate catalyst, prepared according to Example 8, using prior impregnation of the support with ethylene glycol aqueous solution and nickel nitrate aqueous solution. The darker color indicates the presence of nickel oxide.

This example illustrates that ethylene glycol cannot replace glycerin in the present invention, despite its physicochemical proximity, that is, it is not enough to be a polar hydrocarbon. Ten grams of a magnesium aluminate-type support (DYTECH, Ceraguard 1616, with dimensions of 16×16×7 mm, in the shape of a ring with 6 holes) were broken into smaller pieces. The support was then immersed in an ethylene glycol solution (70% m/m) and water for 10 minutes, drained and dried at 70° C. for 30 minutes. Next, the support was immersed in an aqueous solution containing 70% m/m of nickel nitrate $(Ni(NO_3)_2 \cdot 6H_2O)$, at room temperature for periods between 3 minutes and 1 hour. Next, the material was separated from the solution, dried at 100° C. for 1 hour and calcined at 400° C. for 1 hour. The final catalyst showed a distribution of nickel oxide inside the particle, as seen in FIG. 6, for all tested contact times.

Example 9

Figure 7:
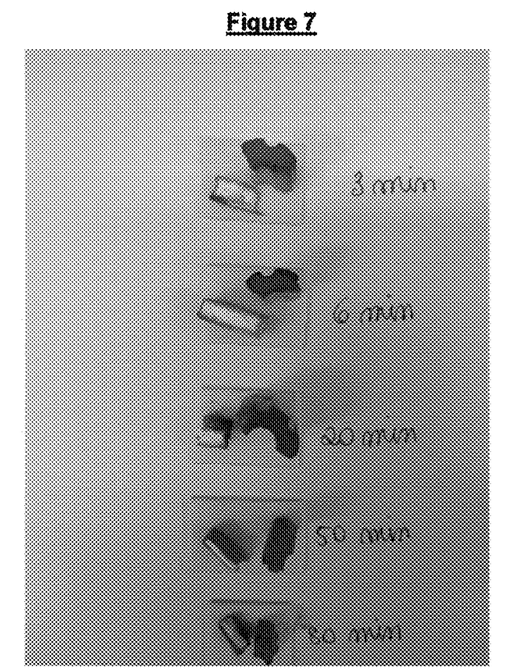
FIG. 7 illustrating a NiO/magnesium aluminate catalyst, prepared according to Example 9, using prior impregnation of the support with ethanol and glycerin solution and nickel nitrate solution in ethanol. The darker color indicates the presence of nickel oxide.

This example, according to the present invention, illustrates the preparation of a catalyst containing nickel oxide located predominantly on the surface or in a layer close to the surface of a commercial support, replacing the water in the solutions with ethanol. One hundred grams of a magnesium aluminate-type support (DYTEC, Ceraguard 1616, with dimensions of 16×16×7 mm in the shape of a ring with 6 holes), without being previously dried, were immersed in a solution containing 80% glycerin and 20% ethanol, at room temperature (25° C.) for 10 minutes, followed by gravity drainage and drying at 70° C. for 2 hours to remove the ethanol. Next, the pellets were immersed for 20 minutes in a solution containing 70% m/m of nickel nitrate (Ni $(NO_3)_2 \cdot 6H_2O$) in ethanol at room temperature. The material was then gravity drained, dried at 70° C. for 2 hours and calcined with a temperature scheduling from 70° C. to 400° C. at a rate of 10° C./min. The temperature of 400° C. was maintained for 2 hours. The pellets were broken for visual inspection, which showed the predominance of the nickel oxide phase on the surface of the particles, as illustrated in FIG. 7.

Example 10

Figure 8:
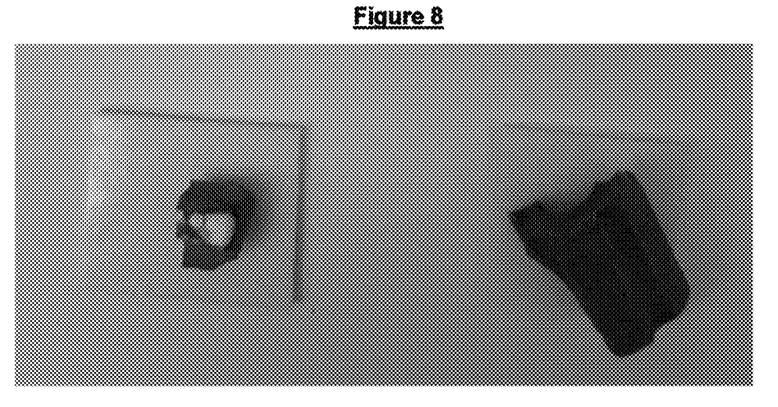
FIG. 8 illustrating a NiO—$La_2O_3$/magnesium aluminate catalyst, prepared according to Example 10, using prior impregnation of the support with glycerin aqueous solution and aqueous solution of nickel and lanthanum nitrate. The darker color indicates the presence of nickel oxide.
Figure 9:
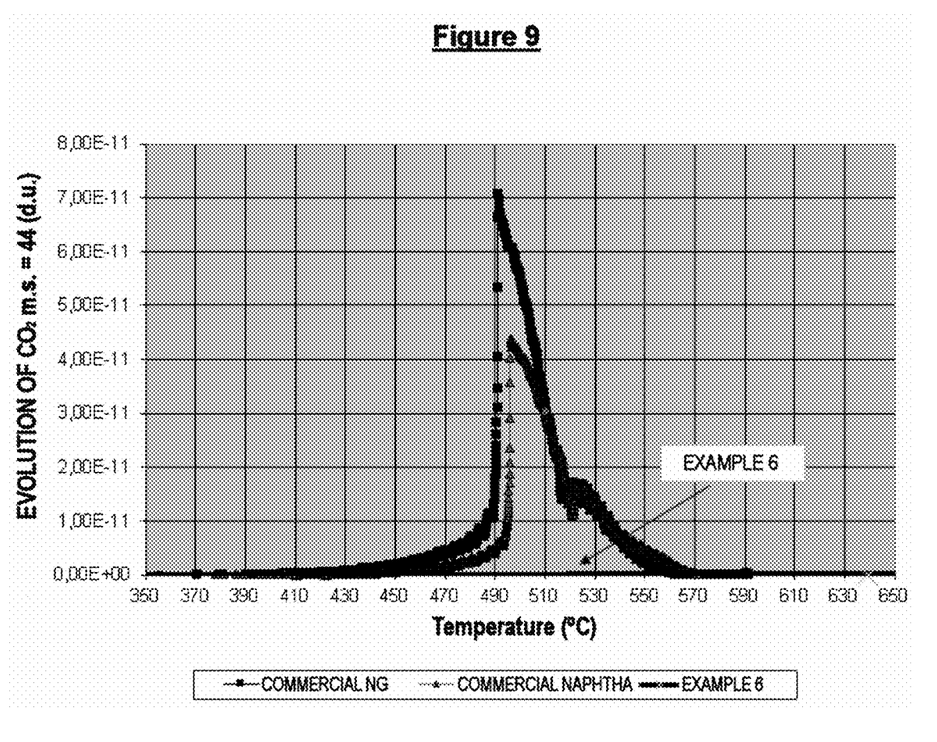
FIG. 9 compares the coke deposition resistance of the catalyst prepared according to Example 6 of the present invention and commercial natural gas and naphtha steam reforming catalysts.

This example, according to the present invention, illustrates the use of salts based on nitrates for the preparation of a catalyst containing nickel oxide and promoted by lanthanum. One hundred grams of a magnesium aluminate-type support (DYTEC, Ceraguard 1616, with dimensions of 16×16×7 mm in the shape of a ring with 6 holes), without being previously dried, were immersed in a solution containing 80% glycerin and 20% water, at room temperature (25° C.) for 10 minutes, followed by gravity drainage and drying at 70° C. for 2 hours to remove the water. Next, the pellets were immersed for 60 minutes in an aqueous solution containing 210 g of nickel nitrate ($Ni(NO_3)_2 \cdot 6H_2O$), 32 g of lanthanum nitrate ($La(NO_3)_3 \cdot 6H_2O$ and 90 g of water at 50° C. The material was gravity drained, dried at 70° C. for 2 hours and calcined with a temperature scheduling from 70° C. to 400° C. at a rate of 10° C./min. The temperature of 400° C. was maintained for 2 hours. The pellets were broken for visual inspection, which showed the predominance of the nickel oxide phase on the surface of the particles, as illustrated in FIG. 8.

Example 11

This comparative example, according to the state of the art, shows the preparation of a conventional catalyst, that is, with predominantly homogeneous distribution along the particle. Preparation was carried out in a similar manner to Example 4, except that glycerin was not used. One hundred grams of a magnesium aluminate-type support (DYTEC, Ceraguard 1616, with dimensions of 16×16×7 mm in the shape of a ring with 6 holes), without being previously dried, were immersed in water at room temperature (25° C.) for 10 minutes, followed by gravity drainage and drying at 70° C. for 2 hours to remove the water. Next, the pellets were immersed for 20 minutes in an aqueous solution containing 70% m/m of nickel nitrate ($Ni(NO_3)_2 \cdot 6H_2O$) at room temperature. The material was then gravity drained, dried at 70° C. for 2 hours and calcined with a temperature scheduling from 70° C. to 400° C. at a rate of 10° C./min. The temperature of 400° C. was maintained for 2 hours. The pellets were broken for visual inspection, which showed the predominance of the nickel oxide phase on the surface of the particles, as shown in FIG. 4.

Example 12

This example illustrates the use of the catalyst of the present invention for the steam reforming reaction. The activity of the catalysts was experimentally determined in a commercial equipment AutoChem II (Micrometrics). The tests were performed using 200 mg of the solid, in a range smaller than 170 mesh, obtained by scraping the outer surface of the samples. Initially, an activation (reduction) step was carried out at a temperature of 750° C., at atmospheric pressure, for two hours, by passing 40 mL/min of a mixture containing 10% $H_2$/argon saturated with water vapor at 50° C. over the catalyst. After the activation, the methane steam reforming reaction was carried out, by passing a stream of methane (99.99%) saturated in water vapor at 90° C., which corresponds to a steam/carbon ratio of 2.3 mol/mol, at reaction temperatures of 500° C., 550° C. and 600° C., respectively. The effluent gases from the reactor were analyzed by gas chromatography and the activity measured by the degree of methane conversion.

Table 1 presents the results of the catalytic activity of steam reforming of methane at different temperatures, and it can be observed that: a) the catalysts according to the present invention show superior activity to the materials prepared according to the state of the art (comparison of Example 2 with the other examples in Table 1), with the additional advantage of having a lower NiO content/product mass; b) the activity of the catalyst of the present invention can be adjusted by the number of preparation steps, without losing the nature of the eggshell distribution of the nickel phase (comparison between Examples 4, 5 and 6 of Table 1); and c) the developed method allows the use of promoters, such as lanthanum, which allow an even higher activity to be obtained, while maintaining the eggshell distribution (comparison of Examples 5 and 10).

TABLE 1

| | | Catalytic Activity | | |
|---|---|---|---|---|
| Example | Type | T = 500° C. | T = 550° C. | T = 600° C. |
| 2 | Magnesium Ni-aluminate (1 step) | 20.0 | 28.0 | 34.0 |
| 4 | Magnesium Ni-aluminate (1 step) | 24.0 | 34.0 | 41.0 |
| 5 | Magnesium Ni-aluminate (2 steps) | 27.0 | 36.0 | 44.0 |
| 6 | Magnesium Ni-aluminate (3 steps) | 34.0 | 46.0 | 52.0 |
| 10 | Magnesium Ni-La-aluminate (2 steps) | 33.0 | 44.0 | 48.0 |

Example 13

This example illustrates that the catalysts prepared according to the present invention have resistance to coke deposition superior to those prepared according to prior art, making them especially suitable for use in the production of hydrogen by the steam reforming reaction. The procedure for measuring the resistance of coke deposition consisted of: a) reducing the catalysts in $H_2$ flow at 700° C. for 2 h to obtain the active phase of metallic nickel; b) carrying out the $CH_4$ steam reforming reaction at a temperature of 600° C., atmospheric pressure and a steam/carbon ratio of 0.01 mol/mol for 15 minutes for the deposition of coke; c) reducing the reactor temperature in $N_2$ flow to 350° C.; d) carrying out the combustion of the deposited coke in a synthetic air flow, with temperature scheduling from 350° C. to 650° C. at a rate of 150° C./h, following the evolution of $CO_2$ by mass spectrometry. A lower evolution of $CO_2$ indicates a lower content of deposited coke, that is, a greater resistance of the catalyst to coke deposition.

The more resistant, more active and robust catalysts contribute to the reduction of the risk of the appearance of high temperature regions of the wall of the tubes of the reformer of the hydrogen production process. Such a situation tends to reduce the useful life of the tubes with the risk of unscheduled shutdowns of the unit and personal risks.

The steam reforming catalyst is the essential part of the $H_2$ generation process. Its performance affects the entire unit. The higher the catalyst activity, the lower the temperature of the reformer tubes, allowing them to operate in less severe conditions and, therefore, with greater potential to reach the expected campaign.

More active steam reforming catalysts provide a reduction in the fuel used in the $H_2$ production process, with a consequent reduction in $CO_2$ emissions. The invention also allows a use for glycerin, which is a by-product of the biodiesel production process.

It should be noted that, although the present invention has been described in relation to the attached drawings, it may undergo modifications and adaptations by technicians skilled on the subject, depending on the specific situation, but provided that it is within the inventive scope defined herein.

The invention claimed is:

1. A method of preparing a steam reforming catalyst, the method comprising:
    a) impregnating an inorganic oxide support with a solution of glycerin and polar solvent, at temperatures lower than 90° C. and contact times of less than 1 hour;
    b) drying the inorganic oxide support of step (a) to remove the polar solvent, at a temperature between 50° C. and lower than 290° C. such that glycerin remains in the inorganic oxide support;
    c) impregnating the inorganic oxide support containing glycerin obtained in step (b) with a solution containing a nickel salt and optionally promoters, at a temperature between 25° C. and 90° C. and contact times between the nickel solution and the inorganic oxide support containing glycerin of less than 1 hour;
    d) drying the catalyst obtained in step (c) at a temperature of less than 150° C.;
    e) calcining the catalyst at temperatures between 300° C. and 600° C.;
    f) optionally, repeating steps c) to e) to obtain the desired content of nickel oxide in the catalyst.

2. The method of preparing the steam reforming catalyst according to claim 1, wherein the inorganic oxide support is selected from alpha- or theta-alumina, calcium aluminate, magnesium aluminate, hexa-aluminates, or a mixture thereof.

3. The method of preparing the steam reforming catalyst according to claim 1, the promoters are lanthanum, cerium, or a combination thereof.

4. The method of preparing the steam reforming catalyst according to claim 2, wherein a shape of particles of the inorganic oxide support is cylindrical or spherical, contains one or multiple holes, and/or has a smooth or wavy outer surface.

5. The method of preparing the steam reforming catalyst according to claim 4, wherein the particles have diameters and lengths between 10 mm and 25 mm and a surface area between 1 and 100 $m^2/g$.

6. The method of preparing the steam reforming catalyst according to claim 5, wherein the surface area of the particles is between 10 $m^2/g$ and 80 $m^2/g$.

7. The method of preparing the steam reforming catalyst according to claim 1, the wherein impregnation of the inorganic oxide support with glycerin is carried out by a pore volume method or by an excess solution method.

8. The method of preparing the steam reforming catalyst according to claim 1, wherein the polar solvent used to impregnate the inorganic oxide support with glycerin is water.

9. The method of preparing the steam reforming catalyst according to claim 1, wherein, in step (a), a polar solvent: glycerin ratio is adjusted in order to control a thickness of an active phase on the inorganic oxide support.

10. The method of preparing the steam reforming catalyst according to claim 1, wherein drying the inorganic oxide support (step (b)) is carried out at temperatures between 50° C. and 90° C.

11. The method of preparing the steam reforming catalyst according to claim 1, wherein the impregnation step c) with the nickel salt uses nickel nitrate.

12. The method of preparing the steam reforming catalyst according to claim 1, wherein the impregnation of step (c) occurs at temperatures of up to 90° C., with the contact time between the nickel solution and the inorganic oxide support containing glycerin of less than 30 minutes.

13. The method of preparing the steam reforming catalyst according to claim 1, wherein the calcination temperature of step e) is between 350° C. and 450° C.

14. The method of preparing the steam reforming catalyst according to claim 1, wherein the nickel oxide and optional promoters are deposited on an outer surface of the inorganic oxide support.

15. The method of preparing the steam reforming catalyst according to claim 1, wherein the catalyst comprises an active phase layer comprising nickel oxide that has a thickness of less than 0.2 mm.

16. The method of preparing the steam reforming catalyst according to claim 1, wherein the polar solvent comprises methanol, ethanol, or water.

17. The method of preparing the steam reforming catalyst according to claim 9, wherein, in step (a), the polar solvent: glycerin ratio is adjusted from 10:90 to 20:80 v/v.

18. The method of preparing the steam reforming catalyst according to claim 15, wherein the thickness of the active phase layer is less than 0.1 mm.

* * * * *